United States Patent
Dejonghe

(10) Patent No.: US 6,363,084 B1
(45) Date of Patent: Mar. 26, 2002

(54) METHOD FOR ESTIMATING COARSE FREQUENCY OFFSET IN OFDM RECEIVER AND APPARATUS EMPLOYING THE SAME

(75) Inventor: Olivier Dejonghe, Metz (FR)

(73) Assignee: Daewoo Electronics Co. Ltd., Seoul (KR)

( * ) Notice: Subject to any disclaimer, the term of this patent is extended or adjusted under 35 U.S.C. 154(b) by 0 days.

(21) Appl. No.: 09/132,908

(22) Filed: Aug. 12, 1998

(30) Foreign Application Priority Data

Nov. 29, 1997 (KR) ............................................ 97-64409

(51) Int. Cl.$^7$ ................................................. H04J 1/02
(52) U.S. Cl. ........................ 370/480; 375/326; 375/354
(58) Field of Search .................................. 370/208, 480, 370/484, 496, 497, 503, 516, 481, 482, 493; 375/260, 326, 332, 344, 354

(56) References Cited

U.S. PATENT DOCUMENTS

| | | | | |
|---|---|---|---|---|
| 5,802,117 A | * | 9/1998 | Ghosh .......................... | 375/344 |
| 6,035,003 A | * | 3/2000 | Park et al. .................... | 375/326 |
| 6,151,369 A | * | 11/2000 | Ohkubo et al. .............. | 375/332 |
| 6,208,695 B1 | * | 3/2001 | Klank et al. ................. | 375/260 |
| 6,275,551 B1 | * | 8/2001 | Nomura et al. ............. | 375/365 |

* cited by examiner

*Primary Examiner*—Huy D. Vu
(74) *Attorney, Agent, or Firm*—Pillsbury Winthrop LLP

(57) ABSTRACT

A method and an apparatus for estimating coarse frequency offset in OFDM receiver are disclosed. The method for estimating coarse frequency offset includes the steps of: a) performing differential decoding process for two adjacent OFDM symbols obtained by performing FFT on the OFDM signal; b) obtaining candidate offset values by using L number of differential decoded values at the same position from the reference signal among differential decoded values; and c) estimating a coarse frequency offset according to positions on which the first and the second maximum values among the 2S+1 number of candidate offset values are present. The apparatus for estimating coarse frequency offset includes an input buffer, a complex multiplier, a storing unit, an address controller, a frequency offset acquisition unit and a frequency offset tracking unit. By the above construction, candidate offset values of constant range are directly obtained on the frequency domain posterior to the FFT processing by using the reference carrier signal inserted within OFDM frames and a coarse frequency offset is estimated within ±½ range of intercarrier spacing. Accordingly, the stable and reliable frequency offset can be obtained.

10 Claims, 4 Drawing Sheets

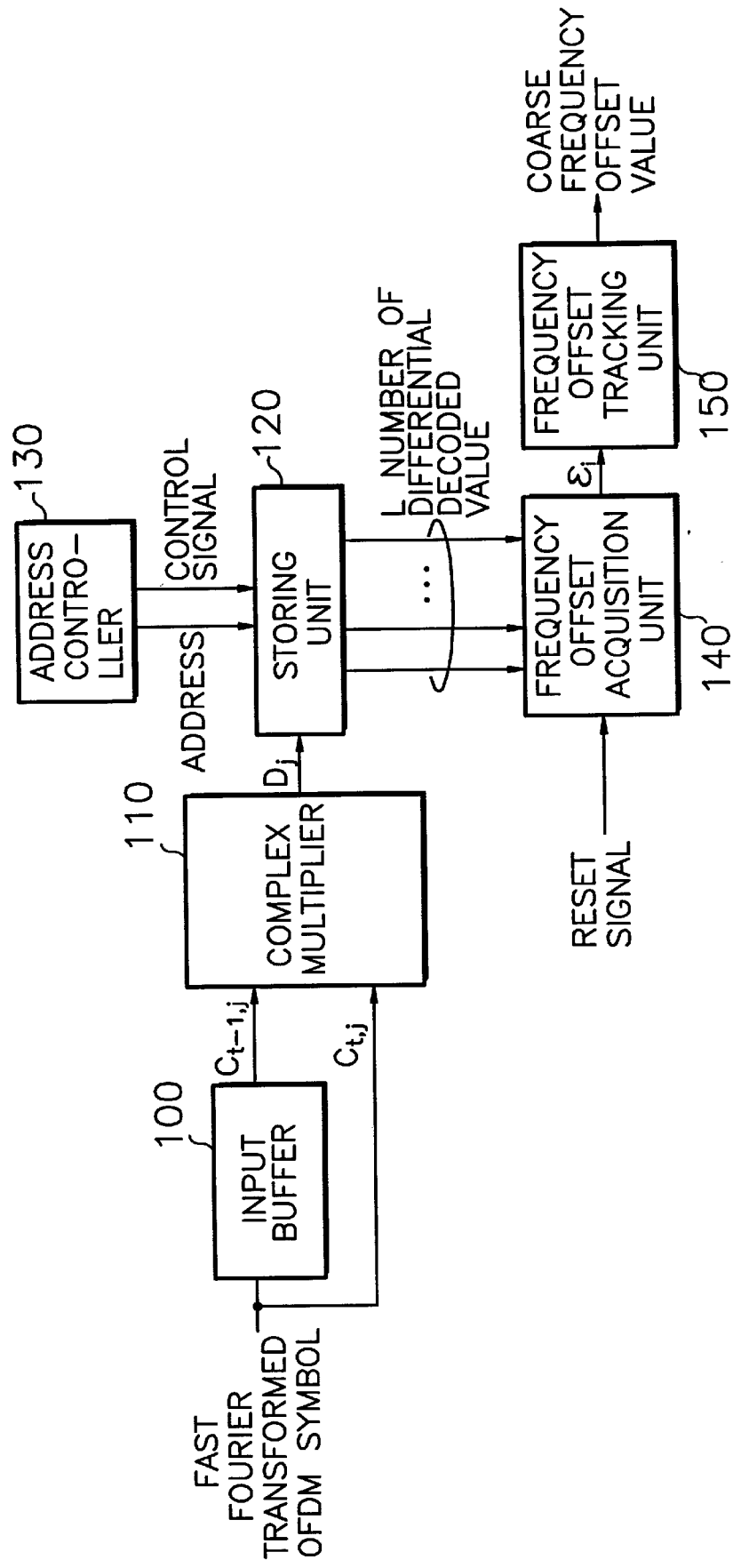

METHOD FOR ESTIMATING COARSE FREQUENCY OFFSET IN OFDM RECEIVER AND APPARATUS EMPLOYING THE SAME

BACKGROUND OF THE INVENTION

1. Field of the Invention

The present invention relates to frequency synchronization for an Orthogonal Frequency Division Multiplexing (OFDM) receiver, and more particularly to a method for estimating a coarse frequency offset within ±½ range of intercarrier spacing and an apparatus employing the same.

2. Description of the Prior Art

In an OFDM method, serially-inputted symbol streams are divided into unit blocks. The symbol streams of each unit block are converted into N number of parallel symbols. After the conversion, these symbols are multiplexed and added by using a plurality of subcarriers having different frequencies, respectively, according to Inverse Fast Fourier Transform (IFFT) algorithm and transmitted via the channel. That is, the N number of parallel symbols are defined as one unit block, and each subcarrier of the unit block has an orthogonal characteristic, which does not have an influence on subchannels. Consequently, in the OFDM method, the Inter-Symbol Interference (ISI) caused by multi-path fading can be reduced by increasing symbol period in proportion to the number of subchannels (N) while maintaining the same symbol transmission rate as that of a single carrier transmission method. Especially, a guard interval is inserted between the transmitted symbols to enhance the capability of the ISI reduction. As a result, a channel equalizer of simplified structure can be implemented.

In the OFDM method, a symbol is detected according to each subchannel. In presence of frequency offset, that is, the difference of carrier frequencies between the transmitter and the receiver, an orthogonal characteristic between each subcarrier frequency is not maintained, causing an interference between adjacent subchannels. Particularly, each subcarrier is closely distributed within a band as the number of OFDM subchannels increase, such that the interference between adjacent subchannels is generated even at a small frequency offset value.

However, the classical frequency synchronization method used in single carrier systems can not be applied to OFDM systems because of the non-linearity of the Fast Fourier Transform (FFT) used in the receiver. For this reason, some methods have been proposed to apply some successive offsets on a rotator, to scan a predefined range and detect the final value to compensate the effect of frequency offset when the reference carriers are correctly positioned.

The method using the rotator above has some disadvantages that the total processing time is increased due to the time necessary for obtaining the frequency offset value within a given range on the time domain prior to the FFT processing. That is, a differential decoding method is used between the current and the previous OFDM symbols to obtain the frequency offset value. Since the differential decoding is performed, 2S+1 number of continuous offset values within the range of $\{-S;S\}$ (here, S refers to a predetermined maximum frequency offset value) applied to the rotator are maintained during at least two OFDM symbols. Accordingly, in the rotator, the time necessary for scanning subcarriers within the range $\{-S;S\}$ is the time necessary for calculating 2S+1 number of estimation values, $\{\epsilon_{-s}, \epsilon_{-s+1}, \ldots, \epsilon_{s-1}, \epsilon_s\}$, namely the time necessary for processing of 2×(2S+1) number of OFDM symbols.

Typically, in terrestrial television broadcasting, transmission signal is composed of frames and each frame includes 68 OFDM symbols. Each symbol is composed of K=6817 carriers (K refers to the number of transmission carrier) in a 8K mode, or K=1705 carriers in a 2K mode. At this time, the delay for obtaining the frequency offset is about 70 OFDM symbols in the 2K mode, or 274 OFDM symbols in the 8K mode. As described above, since it takes more than one OFDM frame (68 OFDM symbols) to obtain the frequency offset, that causes a considerable processing delay in synchronization process.

Further, since the residual offset can be generated within ±½ range of subcarrier when performing the scanning in each subcarrier area, a fine frequency synchronization process posterior to the coarse frequency synchronization is performed. In processing of obtaining the coarse frequency offset, when the frequency offset value is close to ½ or −½ range of intercarrier spacing from the reference signal, the following fine frequency synchronization may be deviated. Accordingly, in order to obtain the accurate frequency synchronization, the second scanning shall be performed in smaller step sizes around the coarse frequency offset value, and as a result, the processing delay is again increased.

SUMMARY OF THE INVENTION

In view of the foregoing, it is an object of the present invention to provide a method for estimating a frequency offset value, which is not accessed to ±½ of intercarrier spacing after direct obtaining of offset values within a traceable range of the frequency domain posterior to a FFT processing by using the reference carrier signal inserted within an OFDM frame in an OFDM receiver.

It is another object of the present invention to provide an apparatus for estimating the coarse frequency offset in an OFDM receiver.

In order to achieve the first object, the present invention provides a method for estimating a coarse frequency offset from an OFDM signal in which a reference signal is inserted at L number of carrier positions within each symbol and information data are inserted at the remaining carrier positions in an OFDM receiver, comprising the steps of: a) performing differential decoding process for two adjacent OFDM symbols obtained by performing FFT on the OFDM signal; b) obtaining 2S+1 number of candidate offset values $\{\epsilon_{-s}; \epsilon_s\}$, which are present on a predetermined range $\{-S; S\}$ by using L number of differential decoded values at the same position from the reference signal among differential decoded values obtained from the step a); and c) estimating a coarse frequency offset value according to positions on which a first and a second maximum values among the 2S+1 number of candidate offset values obtained from the step b) are present.

In order to achieve the second object, the present invention provides an apparatus for estimating a coarse frequency offset from an OFDM signal in which a reference signal is inserted at L number of carrier positions within each symbol and information data are inserted at the remaining carrier positions in an OFDM receiver, comprising: an input buffer for receiving continuous OFDM symbols in unit of sample clock on the frequency domain obtained by performing FFT on the OFDM signal, delaying them as much as symbol length, and outputting delayed symbols in unit of sample clock; a complex multiplier for performing differential decoding process for a previous OFDM sample outputted from the input buffer and a current OFDM sample; a storing unit for receiving serially and storing differential decoded values outputted from the complex multiplier and outputting them at random; an address controller for generating address and control signals to control the storing unit; a frequency offset acquisition unit for summing up L number of differential decoded values at the same position from the reference signal outputted from the storing unit by each sample clock, calculating an absolute value of the summed value, and generating 2S+1 number of candidate offset values $\epsilon_i$, where $\epsilon_i$ refers to an integer of $-S \leq i \leq S$, and S refers to a predetermined maximum frequency offset; and a frequency offset tracking unit for checking the 2S+1 number of candidate offset values obtained from the frequency offset acquisition unit and determining the coarse frequency offset according to positions of the first and the second maximum values.

BRIEF DESCRIPTION OF THE DRAWINGS

The above objects, features, and advantages of the present invention will be apparent from the following detailed description of the preferred embodiments of the invention in conjunction with the accompanying drawings, in which:

FIG. 4 is a block diagram illustrating a coarse frequency offset estimating apparatus of the present invention in an OFDM receiver.

DETAILED DESCRIPTION OF THE PREFERRED EMBODIMENT

Figure 1:
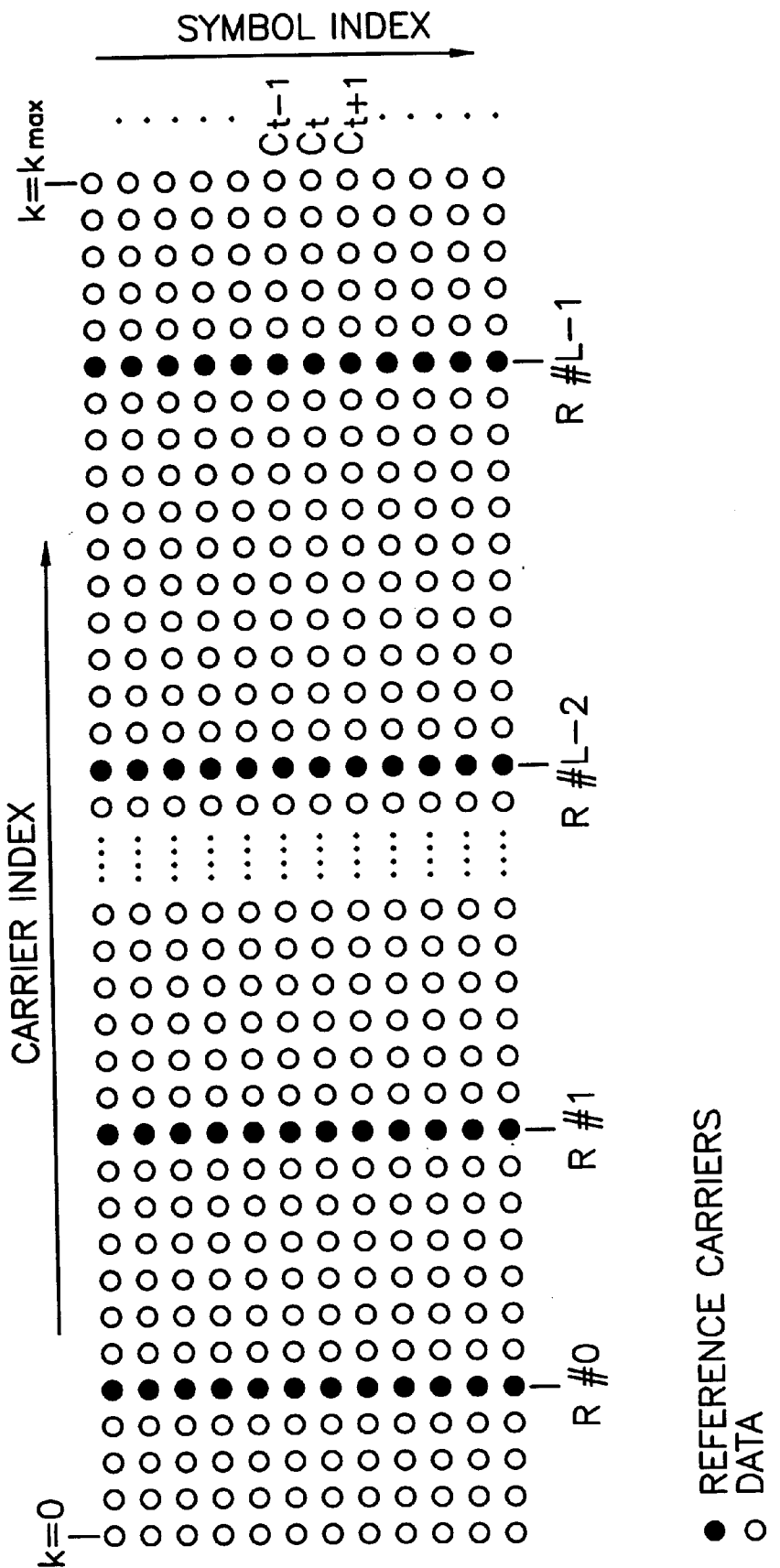
FIG. 1 is a structural diagram illustrating an OFDM frame in which a reference carrier signal is inserted in accordance with the present invention.

Referring to the drawings attached to this specification, detailed description of the preferred embodiment will be given. Wherever possible, the same reference numbers will be used throughout the drawings to refer to the same or like parts.

In the OFDM frame structure shown in FIG. 1, variables $C_t$ and k refer to a symbol index and a carrier index, respectively. Each symbol is composed of samples of N ($=K_{max}+1$) number and each sample modulated into subcarriers having an orthogonal characteristic. In an OFDM symbol, reference carrier signals (hereinafter referred to as reference signal) of L number, namely R#0~R#L−1 number are inserted in the fixed carrier positions. The reference signals are modulated by binary phase shift keying and each of them contains constant phase and amplitude. In the remaining carrier positions, information data are loaded and these information data are quadrature-amplitude-modulated.

The present invention, as shown in FIG. 1, is to trace a coarse frequency synchronization for correcting a deviated frequency by using the reference signals (R#0~R#L−1) inserted in the fixed carrier positions within each symbol.

Hereinafter, two main methods considered as the kernel of the present invention will be described in detail.

The first method is to estimate offset values at the same carrier positions within continuous symbols on the frequency domain. This method is contrast to the conventional method which generates offset values from the samples on the time domain by the rotator and estimates offset values by utilizing the reference carrier positions from the samples on the frequency domain. Namely, the present invention is the method which performs a differential decoding for two continuous OFDM symbols on the frequency domain obtained by FFT processing and obtains the estimated values at each carrier position by using decoding values of positions at the same distance from the reference signal. Accordingly, the processing time is much shortened than that of the conventional method.

The processing time shall be calculated hereinafter, by using the first method. In order to process the differential decoding, only two OFDM symbols are required. The acquisition time therefore consists in the computation time for the 2S+1 estimates for all the successive carrier positions.

At this time, since the reference signal is BPSK-modulated, a generated error value can be corrected if the differential decoding is performed with respect to the samples at the same carrier position for two adjacent symbols on the frequency domain. Accordingly, by processing properly differentially-decoded values, candidate offset values can be obtained.

Figure 2:
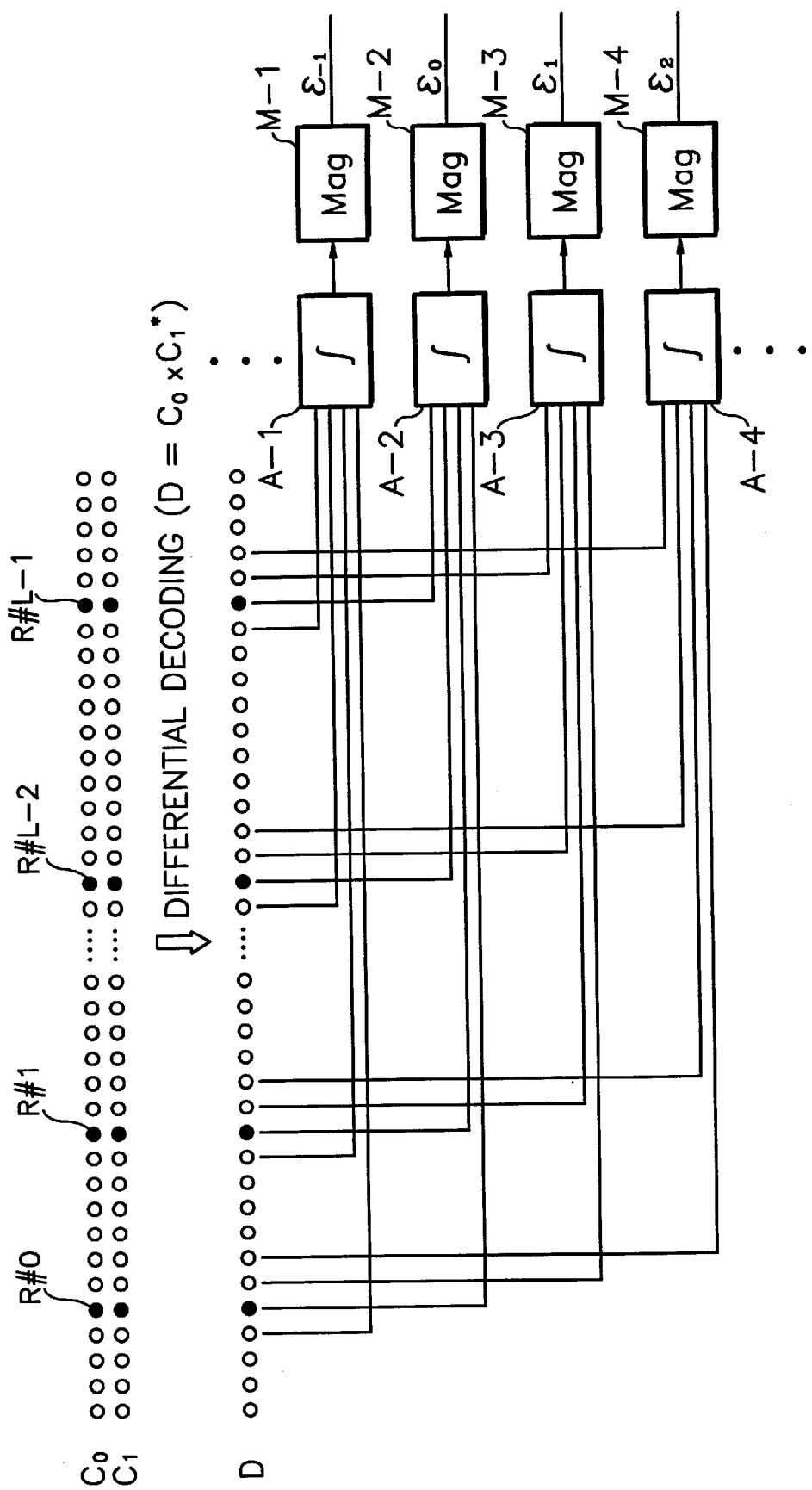
FIG. 2 is a conceptual diagram illustrating a differential decoding processing for obtaining a frequency offset value within a constant range on basis of the reference carrier signal in FIG. 1.

Referring to a conceptual diagram of the differential decoding process shown in FIG. 2, two adjacent OFDM symbols $C_0$ and $C_1$ are composed of N number of samples. The L number of reference signals (R#0~R#L−1) are inserted at regular intervals. By performing the differential decoding for the two OFDM symbols, a differential decoded value can be obtained. A mathematical expression necessary for calculating the differential decoded value $D_j$ is as follows.

[Mathematical Expression 1]

$$D_j = C_{1,j} \times C^*_{0,j} \text{ (for } j=0 \sim N)$$

In this expression, $C_{0,j}$ refers to a sample loaded on the j-th subcarrier of the 0-th received symbol, $C_{1,j}$ refers to a sample loaded on the j-th subcarrier of the first received symbol, N is sample number of one OFDM symbol and * refers to a conjugate complex number.

When the absolute value of the frequency offset is less than ½, a rotation shift between decoded symbols is not generated but an interference between adjacent channels, namely cross-talk phenomenon is generated. The cross-talk phenomenon decreases signal-to-noise ratio (SNR) for the symbol. To express quantitatively the cross-talk phenomenon by the frequency offset, two adjacent symbols are differentially decoded and the value Dj refers to a correlation value between two adjacent symbols.

The calculation method similar to the mathematical expression 1 has been used in the prior art to find the correlation value between two adjacent symbols. In the prior art, since all cases for the predetermined offset range {−S, S} are checked, calculation is repeated 2S+1 times. However, in the present invention, only one calculation is required. Eventually, the time necessary for checking the correlation value between two adjacent symbols is length of two OFDM symbols, namely sample length of 2N number. Accordingly, the processing speed gets faster relatively, and the memory for storing two symbols necessary for the differential decoding and the memory for storing the differential decoded values as much as the number of samples within a symbol are required.

The values at the same position from the reference signal among the differential decoded values of two symbols obtained by the mathematical expression 1 are added each other by the following mathematical expression 2, to estimate a candidate offset value.

[Mathematical Expression 2]

$$\varepsilon_q = Mag\left(\sum_{j=0}^{L-1} D_{p(j)+q}\right),$$

(for $q \in \{-S,S\}$)

In this expression, Mag refers to a magnitude of complex number, $D_{p(j)+q}$ refers to a decoded value of the (p(j)+q)-th subcarrier, and p(j) refers to a position of the j-th reference signal among L number of reference signals.

By the mathematical expression 2, 2S+1 number of offset values obtained within the range {−S, S} are expressed with $\varepsilon_{-s}, \ldots, \varepsilon_0, \ldots, \varepsilon_s$. Here, $\varepsilon_{-s}$ corresponds to a summed absolute value of differential decoded values at a distance as much as −S from the reference carrier if q equals −S and $\varepsilon_s$ corresponds to a summed absolute value of differential decoded values at a distance as much as S from the reference carrier if q equals S.

To understand easily an input-output relationship that candidate offset values are calculated by the mathematical expression 2, a plurality of adders A-1~A-4 and a plurality of absolute calculators M-1~M-4 are shown in FIG. 2, however a real hardware requires only one adder and one absolute calculator. That is, the differential decoded values stored in the memory are extracted according to a constant clock and the candidate offset values are sequentially calculated in each unit clock in order to timeshare a hardware.

The time necessary for calculating the candidate offset values is the time necessary for summing up the corresponding differential decoded values and L number of samples are required to obtain one candidate offset value. That is, the delay necessary for calculating the 2S+1 number of estimated values is L×(2S+1) samples. Accordingly, the total time necessary for obtaining the coarse frequency synchronization is 2N+L×(2S+1).

By assuming the same channel situation, the comparison result of the frequency offset delay of the present invention and the prior art is as follows. In terrestrial television broadcasting referred in the prior art, the frequency offset delay requires 70 OFDM symbols in a 2K mode or 274 OFDM symbols in a 8K mode. In the present invention, the number of reference carriers within an OFDM frame of the terrestrial television broadcasting forms 2% of the total carrier number. Compared with the prior art, the total time necessary for obtaining the coarse frequency offset of the present invention decreases to about 3 OFDM symbols in the 2K mode or 5 OFDM symbols in the 8K mode. Therefore, this result shows a remarkable decrease compared with the delay of the prior art.

Next, prior to the description of the second method, relation between frequency offset value and receiver performance will be described in detail.

When the frequency offset $|\varepsilon|$ is larger than ½, performance degradation of the receiver is deepened since the frequency offsets bring about a rotation shift between decoded symbols by shifting frequencies of each subcarrier to an adjacent subchannel band. That is, since the signal including the frequency offset brings about rotation shift between decoded symbols posterior to the FFT by a characteristic of Fourier Transform, only rotation shift is generated if the frequency offset value is an integer, whereas both the rotation shift and the cross-talk phenomenon are generated if not. When this rotation shift is generated, it is hard to recover correct carriers though the correction method for recovery is performed. On the other hand, when the frequency offset $|\varepsilon|$ is smaller than ½, only the cross-talk phenomenon is generated without the rotation shift. Accordingly, in the frequency offset correction method, it is indispensable to reduce the frequency offset value within the range ($|\varepsilon|<½$) in which the rotation shift is not generated.

The second method is to use the algorithm, which doesn't approach the obtained frequency offset value to the ½ or −½ range of intercarrier spacing from the reference signal. In the prior art, after checking the 2S+1 number of estimated offset values, only the maximum value of them has been extracted to determine a final offset value. However, in the present invention, the first maximum value (a position of this value is expressed as an index $I_{M1}$) and the second maximum value (a position of this value is expressed as an index $I_{M2}$) among the 2S+1 number of offset values obtained by the first method are detected and a final offset value is determined by considering positions of two values (indexes).

After scanning of all ranges of frequency, the first maximum value of index $I_{M1}$ is used as a reference for correcting the frequency offset if two maximum value indexes, $I_{M1}$ and $I_{M2}$, are not continued. In addition, the index obtained by providing a weight to two maximum value indexes is used as a reference for correcting the frequency offset if two maximum values indexes, $I_{M1}$ and $I_{M2}$, are continued (that is, $I_{M1}=I_{M2}\pm1$). For an example, a new index is obtained by providing the weight corresponding three times of the index $I_{M2}$ to the index $I_{M1}$, like ¾ $I_{M1}$+¼ $I_{M2}$ and the value estimated from a position of the new index is determined finally as a frequency offset value.

Figure 3A:
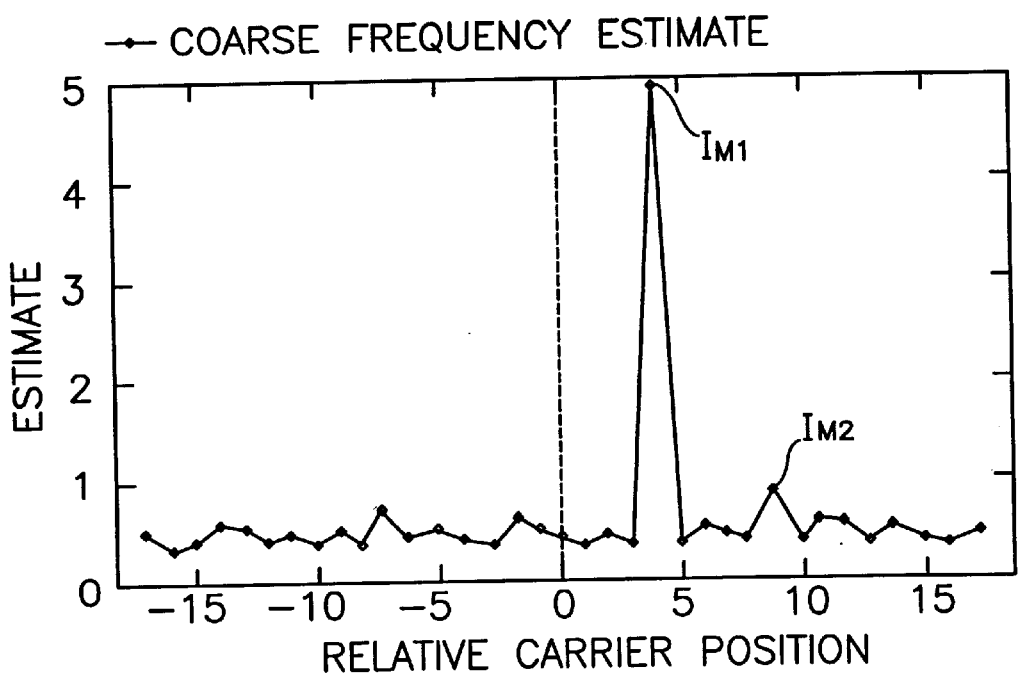
FIGS. 3A and 3B are graphs illustrating simulation results for frequency offset estimation values according to the positions of subcarriers on the frequency domain obtained by a coarse frequency offset estimating method of the present invention.
Figure 3B:
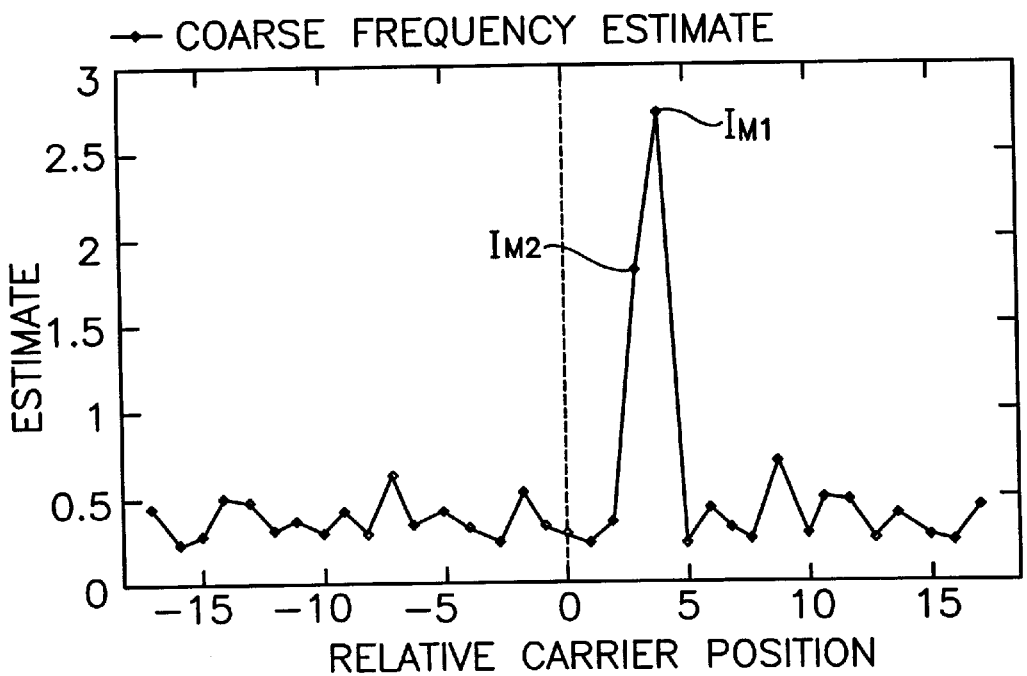

FIGS. 3A and 3B show continuously the offset values estimated according to the above proposed method in a traceable range determined as subcarrier of {−17, +17}. FIGS. 3A and 3B show a case of two continued maximum values and a case of two discontinued maximum values, respectively.

Referring to FIG. 3A, the maximum offset value obtained from index 4 ($=I_{M1}$) is close to a multiple of subcarrier and shows a considerable peak value distinguished from other estimation values. Accordingly, the maximum offset value obtained from index 4 is used as a coarse frequency offset value. Since the first and the second maximum values are not adjacent to each other, the second maximum value obtained from index 9 ($=I_{M2}$) is not considered.

Referring to FIG. 3B, as two maximum values are continuously obtained from indexes 3 ($=I_{M2}$) and 4 ($=I_{M1}$), the position of the offset value is determined by providing the weight between two indexes. At this time, the weight is not necessarily an accurate numerical value. The weight is provided in order not to locate the offset value at an intercarrier spacing. However, a set {½, ½} of coefficients is not used as the weight, because it can happen that the two indexes are hazardously contiguous, which would make the acquisition worse than using a single maximum value. To compose a real hardware simply, it is desirable to use a set of {¾, ¼} as the weight coefficient Next, referring to FIG. 4, a construction and an operation of the present invention will be described in detail.

The reference signals are inserted at L number of fixed carrier positions except data within the OFDM frame and the coarse frequency offset value is obtained within ±½ range of an intercarrier spacing by using the reference signals. The reference signals are signals having constant phases and amplitudes. The coarse frequency offset estimator obtains candidate offset values by adequate processing of OFDM symbols on the frequency domain obtained after performing the FFT processing for the received OFDM signal, and then determines the final offset value for being corrected from the obtained candidate offset values.

In FIG. 4, the coarse frequency offset estimating apparatus includes an input buffer 100, a complex multiplier 110, a storing unit 120, an address controller 130, a frequency offset acquisition unit 140, and a frequency offset tracking unit 150.

The input buffer 100 receives continuous OFDM symbols $C_t$ posterior to the FFT processing in sample units $C_{t,j}$, delays them as much as the length of one symbol (N sample), and outputs them in sample units. The input buffer 100 is embodied by a FIFO buffer.

The complex multiplier 110 multiplies the previous OFDM sample $C_{t-1,j}$ outputted from the input buffer 100 by the current OFDM sample $C_{t,j}$ in order to process a differential decoding. That is, a conjugate complex number of the previous sample is multiplied by a conjugated complex number of the current sample to output a differential decoded value. An expression necessary for the differential decoding operation is the same as the above mathematical expression 1.

The storing unit 120 receives serially and stores the differential decoded values is $D_j$ outputted from the complex multiplier 110, and outputs them at random. The storing unit 120 can be composed of a dual port random access memory (DPRAM) for controlling separately an input and an output.

The address controller 130 generates address and control signals for controlling an output from the storing unit 120. The rule necessary for generating the address and control signals is to form one group by grouping the L number of differential decoded values at the same position from the reference signal (refer to R#0~R#L-1 of FIG. 1) stored in the storing unit 120 and to output groups in parallel by each sample clock.

The frequency offset acquisition unit 140 sums up the L number of differential decoded values outputted at random from the storing unit 120 by each sample, calculates an absolute value of the summed value, and outputs candidate offset values $\epsilon_i$ ($\epsilon_i$ refers to an integer of $-S \leq i \leq S$ and S refers to a predetermined maximum frequency offset). The frequency offset acquisition unit 140 includes an integrator reset by each symbol clock to integrate L number of the differential decoded values and an absolute value calculator for receiving an output from the integrator and calculating the magnitude of a complex number ($|Re|+|Im|$).

The frequency offset tracking unit 150 checks the 2S+1 number of candidate offset values $\{\epsilon_{-s}; \epsilon_s\}$ obtained from the frequency offset acquisition unit 140 and outputs a coarse frequency offset value to be finally corrected according to positions of the first and second maximum values. The frequency offset tracking unit 150 is composed of the simplified logical circuit capable of processing an algorithm for detecting the maximum values and weighting two maximum values and a Digital Signal Processing (DSP) method.

That is, the candidate offset values are scanned to detect the maximum values. Next, the position indexes $I_{M1}$ and $I_{M2}$ having the first and second maximum values are checked. The first maximum value index $I_{M1}$ is determined as the coarse frequency offset value to be corrected if the first and second maximum value indexes $I_{M1}$ and $I_{M2}$ are not continuously located (that is, $I_{M1} \neq I_{M2} \pm 1$). In addition, the value obtained between two maximum values by weighting two maximum value indexes is determined as the coarse frequency offset value to be corrected if the first and second maximum value indexes $I_{M1}$ and $I_{M2}$ are continuously located (that is, $I_{M1}=I_{M2}\pm 1$).

In the prior art, to obtain the 2S+1 number of estimation values, operation is performed 2S+1 times. However, in the present invention, since the 2S+1 number of estimation values are calculated in parallel by only one operation, the processing time can be shortened. At this time, due to the differential decoding operation, a memory for storing two OFDM symbols (that is, the 2N number of samples) and a delay as much as the same are required.

Components of an apparatus for obtaining the coarse frequency synchronization shown in FIG. 4, the complex multiplier 110 and the input buffer 100 for example can be utilized for other objects except for an object of the present invention. A process of obtaining the coarse frequency synchronization is performed once. After the coarse frequency is obtained, a fine frequency tuning is performed. Typically, in the fine frequency tuning, since the correlationship is calculated by performing the differential decoding process for continuous OFDM symbols, the complex multiplier and the input buffer necessary for processing the differential decoding can be reused.

In addition, as the storing unit 120 for strong the differential decoded OFDM symbols is composed of the DPRAM, it can be reused for an equalizing process posterior to the synchronization process. That is, the storing unit 120 can be used to store updated filter bank coefficients in an adaptive equalizer, whereas it can be used to store channel response interpolation values in non-adaptive equalizer.

As described above, according to the present invention, candidate offset values are obtained by using differential decoded values at the same position from the reference signal among differential decoded values obtained by differential decoding process for two adjacent OFDM symbols. Then, a coarse frequency offset value is estimated according to positions on which the first and the second maximum values among the candidate offset values are present. As a result, frequency synchronization can be performed at a high speed and a reliable coarse frequency offset can be obtained. In addition, since devices used in the present invention are compatible with other synchronization apparatuses or equalizers, the total hardware of the OFDM receiver can be simplified. Moreover, since the frequency synchronization is not achieved within the intercarrier spacing, the stable and reliable frequency offset is obtained. In addition, the stable and reliable offset value can be obtained since the frequency synchronization is not achieved around intercarrier spacing by using the above two maximum values algorithm.

While this invention has been described in connection with what is presently considered to be the most practical and preferred embodiments, it is to be understood that the invention is not limited to the disclosed embodiment, but, on the contrary, it is intended to cover various modifications and equivalent arrangements included within the spirit and scope of the appended claims.

What is claimed is:

1. A method for estimating a coarse frequency offset from an OFDM signal in which a reference signal is inserted at L number of carrier positions within each symbol and information data are inserted at the remaining carrier positions in an OFDM receiver, comprising the steps of:

a) performing differential decoding process for two adjacent OFDM symbols obtained by performing FFT on the OFDM signal;

b) obtaining 2S+1 number of candidate offset values $\{\epsilon_{-s}; \epsilon_s\}$, which are present on a predetermined range $\{-S; S\}$ by using L number of differential decoded values at the same position from the reference signal among differential decoded values obtained from said step a); and c) estimating a coarse frequency offset value according to positions on which a first and a second maximum values among the 2S+1 number of candidate offset values obtained from said step b) are present.

2. The method of claim 1, wherein the differential decoded values ($D_j$) in said step a) are obtained by the following mathematical expression;

$$D_j = C_{t,j} \times C^*_{t-1,j} \text{ (for } j=0 \sim N),$$

where $C_{t,j}$ refers to a sample loaded on the j-th subcarrier of the t-th received symbol, $C_{t-1,j}$ refers to a sample loaded on j-th subcarrier of the (t−1)-th received symbol, N is sample number of one OFDM symbol, and * refers to a conjugate complex number.

3. The method of claim 1, wherein the 2S+1 number of candidate offset values ($\epsilon_q$) in said step b) are obtained by the following mathematical expression;

$$\varepsilon_q = Mag\left(\sum_{j=0}^{L-1} D_{p(j)+q}\right)$$

(for $q \in \{-S, S\}$), where Mag refers to a magnitude of complex number, $D_{p(j)+q}$ refers to a differential decoded value of the (p(j)+q−)-th subcarrier, and p(j) refers to a position of the j-th reference signal of L number of reference signals.

4. The method of claim 1, wherein said step c) comprises the steps of:

c1) detecting the first and the second maximum values of the 2S+1 number of candidate offset values;

c2) generating the first maximum value as the coarse frequency offset if the first and the second maximum values detected from said step c1) are not continuously located; and c3) generating the frequency offset located in a new index obtained by providing a predetermined weight to indexes for indicating positions of the two maximum values as the coarse frequency offset if the first and the second maximum values detected from said step c1) are continuously located.

5. An apparatus for estimating a coarse frequency offset from an OFDM signal in which a reference signal is inserted at L number of carrier positions within each symbol and information data are inserted at the remaining carrier positions in an OFDM receiver, comprising:

an input buffer for receiving continuous OFDM symbols in unit locating first and second maximum values among the 2S+1 number of candidate offset values of sample clock on the frequency domain obtained by performing FFT on the OFDM signal, delaying them as much as symbol length, and outputting delayed symbols in unit of sample clock;

a complex multiplier for performing differential decoding process for a previous OFDM sample outputted from said input buffer and a current OFDM sample;

a storing unit for receiving serially and storing differential decoded values outputted from said complex multiplier and outputting them at random;

an address controller for generating address and control signals to control said storing unit;

a frequency offset acquisition unit for summing up L number of differential decoded values at the same position from the reference signal outputted from said storing unit by each sample clock, calculating an absolute value of the summed value, and generating 2S+1 number of candidate offset values $\epsilon_i$, where $\epsilon_i$ refers to an integer of $-S \leq i \leq S$, and S refers to a predetermined maximum frequency offset; and a frequency offset tracking unit for checking the 2S+1 number of candidate offset values obtained from said frequency offset acquisition unit and determining the coarse frequency offset according to positions of the first and the second maximum values.

6. The apparatus of claim 5, wherein said complex multiplier obtains the differential decoded values ($D_j$) by using the following mathematical expression;

$$D_j = C_{t,j} \times C^*_{t-1,j} \ (j=0 \sim N),$$

where $C_{t,j}$ refers to a sample loaded on the j-th subcarrier of the t-th received symbol, $C_{t-1,j}$ refers to a sample loaded on j-th subcarrier of the (t−1)-th received symbol, N is sample number of one OFDM symbol, and * refers to a conjugate complex number.

7. The apparatus of claim 5, wherein said address controller outputs the address and control signals with respect to one group formed by grouping the L number of differential decoded values at the same position from the reference signal to the storing unit by each sample clock.

8. The apparatus of claim 5, wherein said frequency offset acquisition unit is initialized by a reset signal by each symbol clock, integrates the L number of differential decoded values, calculates magnitude of a complex number of the integrated value, and calculates the candidate offset values ($\epsilon_q$) by the following mathematical expression;

$$\varepsilon_q = Mag\left(\sum_{j=0}^{L-1} D_{p(j)+q}\right),$$

(for $q \in (\{-S, S\})$, where Mag refers to magnitude of a complex number, $D_{p(j)+q}$ refers to the differential decoded value of the (p(j)+q)-th subcarrier, and p(j) refers to the position of the J-th reference signal of L number of reference signals.

9. The apparatus of claim 5, wherein said frequency offset tracking unit outputs the first maximum value as the coarse frequency offset if the first and the second maximum values are not continuously located, whereas it extracts the coarse frequency offset from a new index obtained by applying a first and a second weighting values to indexes for indicating positions of two maximum values if the first and the second maximum value indexes are continuously located.

10. The apparatus of claim 9, wherein the sums of the first and the second weighting values is 1 and the two weighting values have different values.

* * * * *